Figure 1:
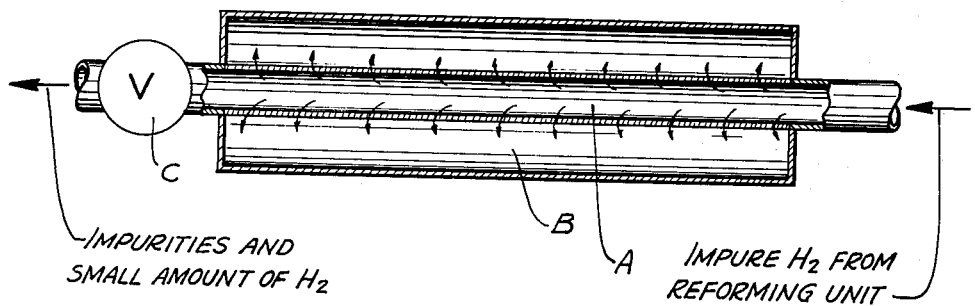

Sept. 8, 1964  H. G. OSWIN  3,148,089
HYDROGEN-PURIFICATION DEVICE FOR USE IN FUEL CELL
Filed Aug. 24, 1960

HARRY G. OSWIN
INVENTOR.

BY WATSON COLE GRINDLE & WATSON

United States Patent Office 3,148,089
Patented Sept. 8, 1964

3,148,089
HYDROGEN-PURIFICATION DEVICE FOR USE IN FUEL CELL
Harry G. Oswin, Elmsford, N.Y., assignor to Leesona Corporation, Cranston, R.I., a corporation of Massachusetts
Filed Aug. 24, 1960, Ser. No. 51,678
5 Claims. (Cl. 136—86)

This invention relates to improved hydrogen-diffusion fuel cell systems and to their construction. More particularly the invention relates to an in situ process of producing hydrogen fuel within a fuel cell.

"Fuel cell" as used in this specification, is the common named applied to an electrochemical cell capable of generating electrical energy through electrochemical combustion of a fuel gas with an oxygen containing gas. These cells comprise a housing, two electrodes and an electrolyte which acts as an oxygen transferring medium. All of the various types of cells proposed consume a fuel such as hydrogen or a hydrocarbon gas at the fuel electrode, removing electrons which are transferred via an external route to an oxidizing electrode where they are consumed. It is essential that the electrolyte employed prevent the molecular forms of the fuel and oxidants from mixing and transferring their electrons directly.

In the prior art most fuel cell electrodes consisted of porous structures in which a three-phase interface system of solid-gas-electrolyte was maintained by a suitable combination of pore size, pressure differential and surface tension. However such structures had numerous disadvantages. For example it was impossible to maintain completely uniform pore size, resulting in a system which operated with the smaller pores of the porous structure flooded with electrolyte due to capillary action or with gas bubbling through the pores unused. To a large extent this problem was overcome by the use of a bi-porous structure wherein large pores fronted the gas of the fuel gas system and the smaller pores faced the electrolyte. The three-phase interface occurred substantially at the bi-porous wall.

These bi-porous structures however, were not the complete answer to the problem and in my co-pending applications entitled "Improved Non-Porous Hydrogen Diffusion Fuel Cell Electrodes," Serial Nos. 51,515 and 51,496, filed August 24, 1960, I have described electrodes fabricated from non-porous palladium or palladium-silver alloys which have been found to be remarkably effective in fuel cells. The instant invention is concerned with the problem of providing a source of fuel at a price commercially feasible for use in a hydrogen-oxygen or hydrogen-air cell utilizing a non-porous fuel electrode.

Accordingly it is the object of the instant invention to provide an in situ process of making hydrogen fuel within a fuel cell.

It is another object of the invention to provide a hydrogen-diffusion electrode capable of separating hydrogen from impurities.

These and other objects of the invention will be apparent from the following detailed description with particular emphasis being directed to the preferred embodiment.

Briefly the invention comprises producing impure hydrogen within the fuel cell device by known methods of reforming hydrocarbons with air and/or steam at temperatures varying from 300–1000° C. The impure hydrogen obtained, containing large amounts of carbon dioxide, nitrogen, carbon monoxide or other oxidation products and hydrocarbon is purified by diffusion through palladium or palladium-silver tubes. These tubes are maintained at temperatures above 100° C. and preferably near the working temperature of the reforming unit.

The reformed gas stream is to be maintained at a pressure of at least 15 p.s.i. and preferably in the neighborhood of 150–500 p.s.i. The reformed gas is circulated through the palladium or palladium-silver tube under pressure, with the hydrogen gas diffusing through the metal membrane into a surrounding chamber or tube maintained at a lower pressure. The surrounding chamber preferably constitutes the fuel electrode. However, if desired the hydrogen gas can be purified and then directed to the fuel cell electrodes.

Turning now to the drawing which shows one embodiment of the invention, the flow of impure gas coming from the reforming unit is circulated through a Pd or Pd-Ag tube A, diffusing the purified hydrogen into chamber B. Chamber B constitutes the fuel electrode of the fuel cell system. The impurities plus a small amount of hydrogen are controlled by an exit valve or pressure-relief valve C so that the exhaust gases contain very little hydrogen. The impurities may be recovered or disposed of as waste.

In the cell it is necessary that the pressure of hydrogen in the exhaust gas be maintained at not less that the hydrogen pressure in the fuel electrode in order to obtain a continuous diffusion of hydrogen from the first tube into the second or electrode tube. Thus preferably the reforming and diffusion unit is operated at high pressures in the neighborhood of 200–500 p.s.i. with the hydrogen gas within the electrode tube being maintained at a lower pressure.

The diffusion tubes can be constructed from pure palladium or palladium-silver alloys. The palladium-silver alloys containing from about 5–40% by weight of silver are operable with an alloy composed of about 25% silver and 75% palladium being preferred because of outstanding fuel electrode properties. Palladium-silver alloy membranes were found to be decidedly superior to pure palladium membranes as electrodes in that they did not become brittle even after long periods of exposure to hydrogen under operating fuel cell conditions and because of superior diffusion characteristics. In addition fuel cells constructed with palladium-silver alloy electrodes exhibited a greater degree of potential stability than did fuel cells using pure palladium electrodes.

The instant fuel cells can be operated with a variety of acid and alkaline electrolytes such as sulfuric acid, phosphoric acid, potassium hydroxide, sodium hydroxide, etc. An outstanding feature of the instant electrodes is the elimination of water formation within the electrode structure. In the instant electrode structure water formation occurs only in the electrolyte and thus does not effect hydrogen diffusion. The water can be conveniently removed from the electrolyte by suitable means.

As explained more fully in my hereinabove referred to co-pending applications entitled "Improved Non-Porous Hydrogen Diffusion Fuel Cell Electrodes," electrodes fabricated from palladium or palladium-silver membranes act as their own metering valve. This is a particularly advantageous and unexpected characteristic of such systems.

The following example is set forth to more particularly illustrate the invention. However, the invention is not to be construed to be limited by the example since other embodiments can be conveniently produced without departing from the scope of the invention.

*Example*

A fuel cell system having a metallic silver oxide coated carbon plate oxidizing electrode, a tubular Pd-Ag alloy fuel electrode, as illustrated in the drawing and using a 28% aqueous potassium hydroxide electrolyte was devised in a suitable housing in combination with a hydrogen reforming unit. The cell was operated with the reforming and diffusion units at a pressure of 200 p.s.i. The pressure in the external electrode tube of the system was maintained at approximately 45 p.s.i. The cell when operated at a temperature of 250° C. sustained a current density of 1600 amps./ft.$^2$.

This fuel cell system comprising an in situ hydrogen gas fuel source and means of separating impurities from the fuel gas materially advances the fuel cell art making it practical to use hydrogen as a fuel.

It is claimed and desired to be secured by Letters Patent:

1. In a fuel cell, a hydrogen diffusion electrode structure in combination with a hydrocarbon reforming unit, said electrode structure being composed of internal and external tubes, the internal tube carrying hydrogen and gaseous impurities under pressure from the reforming unit and diffusing hydrogen into the external tube, said external tube in combination with the internal tube forming the fuel gas compartment and being the fuel electrode of the fuel cell, the pressure of the gas between the internal and external non-porous tubes being maintained at a lower pressure than in the internal tube, said non-porous tubes being members of the group consisting of palladium and palladium-silver alloys containing from 5–40% by weight silver.

2. The electrode structure of claim 1 wherein the tubes are composed of a palladium-silver alloy.

3. The in situ process of supplying a fuel gas to a hydrogen diffusion fuel cell comprising reforming hydrocarbons into gaseous components, flowing said gaseous components through a first non-porous tube under pressure whereby the hydrogen gas diffuses from said tube into a second non-porous tube, said second non-porous tube in combination with the first tube forming the fuel gas compartment and fuel electrode, the pressure of the gases between said second tube and the first non-porous tube being maintained at a lower pressure than in the first tube, said tubes being members of the group consisting of palladium and palladium-silver alloy containing from 5–40% by weight silver.

4. The process of claim 3 wherein the tubes are composed of a palladium-silver alloy.

5. The process of claim 3 wherein the reforming unit is maintained at a temperature of from 300–800° C. and at a pressure of from 150–500 p.s.i.

References Cited in the file of this patent

UNITED STATES PATENTS

| | | |
|---|---|---|
| 1,182,759 | Emanuel | May 9, 1916 |
| 2,175,523 | Greger | Oct. 10, 1939 |
| 2,384,463 | Gunn et al. | Sept. 11, 1945 |
| 2,860,175 | Justi | Nov. 11, 1958 |
| 2,901,523 | Justi et al. | Aug. 25, 1959 |
| 2,913,511 | Grubb | Nov. 17, 1959 |
| 3,020,327 | Ruetschi | Feb. 6, 1962 |

FOREIGN PATENTS

| | | |
|---|---|---|
| 626,767 | Canada | Sept. 5, 1961 |